(12) United States Patent
Apte et al.

(10) Patent No.: US 11,016,740 B2
(45) Date of Patent: May 25, 2021

(54) SYSTEMS AND METHODS FOR VIRTUAL PROGRAMMING BY ARTIFICIAL INTELLIGENCE

(71) Applicant: ATOS SYNTEL, INC., Troy, MI (US)

(72) Inventors: Abhijit Anil Apte, Pune (IN); Akhila Chapalgaonkar, Pune (IN); Ritesh Tukaram Sherkar, Pune (IN); Jotiram Vithalrao More, Pune (IN); Ajay Purekar, Pune (IN); Kaustubh Hardas, Pune (IN); Prabhat Parey, Pune (IN); Pooja Vitthal Zende, Pune (IN); Lopamudra Dhal, Pune (IN); Yogeshkumar Kishor Agashe, Pune (IN); Rama Mohan Ganta, Pune (IN)

(73) Assignee: ATOS SYNTEL, INC., Troy, MI (US)

( * ) Notice: Subject to any disclaimer, the term of this patent is extended or adjusted under 35 U.S.C. 154(b) by 51 days.

(21) Appl. No.: 16/714,219

(22) Filed: Dec. 13, 2019

(65) Prior Publication Data
US 2020/0272435 A1  Aug. 27, 2020

Related U.S. Application Data

(60) Provisional application No. 62/810,103, filed on Feb. 25, 2019.

(51) Int. Cl.
*G06F 9/44* (2018.01)
*G06F 8/36* (2018.01)
*G06F 40/30* (2020.01)
*G06N 5/02* (2006.01)
*G06N 5/04* (2006.01)

(52) U.S. Cl.
CPC ............... *G06F 8/36* (2013.01); *G06F 40/30* (2020.01); *G06N 5/02* (2013.01); *G06N 5/04* (2013.01)

(58) Field of Classification Search
CPC ........................................................ G06F 9/44
See application file for complete search history.

(56) References Cited

U.S. PATENT DOCUMENTS

| 10,565,093 | B1 * | 2/2020 | Herrin .................. G06F 11/3664 |
| 2018/0046570 | A1 * | 2/2018 | Kaulgud .............. G06F 11/3672 |
| 2019/0087731 | A1 * | 3/2019 | Hull .......................... G06F 8/20 |

\* cited by examiner

*Primary Examiner* — Jae U Jeon
(74) *Attorney, Agent, or Firm* — Arc IP Law, PC; Joseph J. Mayo

(57) ABSTRACT

Systems and methods of generating a computer program using artificial intelligence module include generating logic programming by analyzing natural language in sample input data received from an external source, the sample input data resulting in a known output. Select input data, which includes select natural language or a coding instruction including the select natural language, is received. Context data is generated by processing the select natural language. The logic programming based on the context data is selected. A computing instruction is determined for the select input data using the logic programming, and the computer program including the computing instruction is generated.

24 Claims, 12 Drawing Sheets

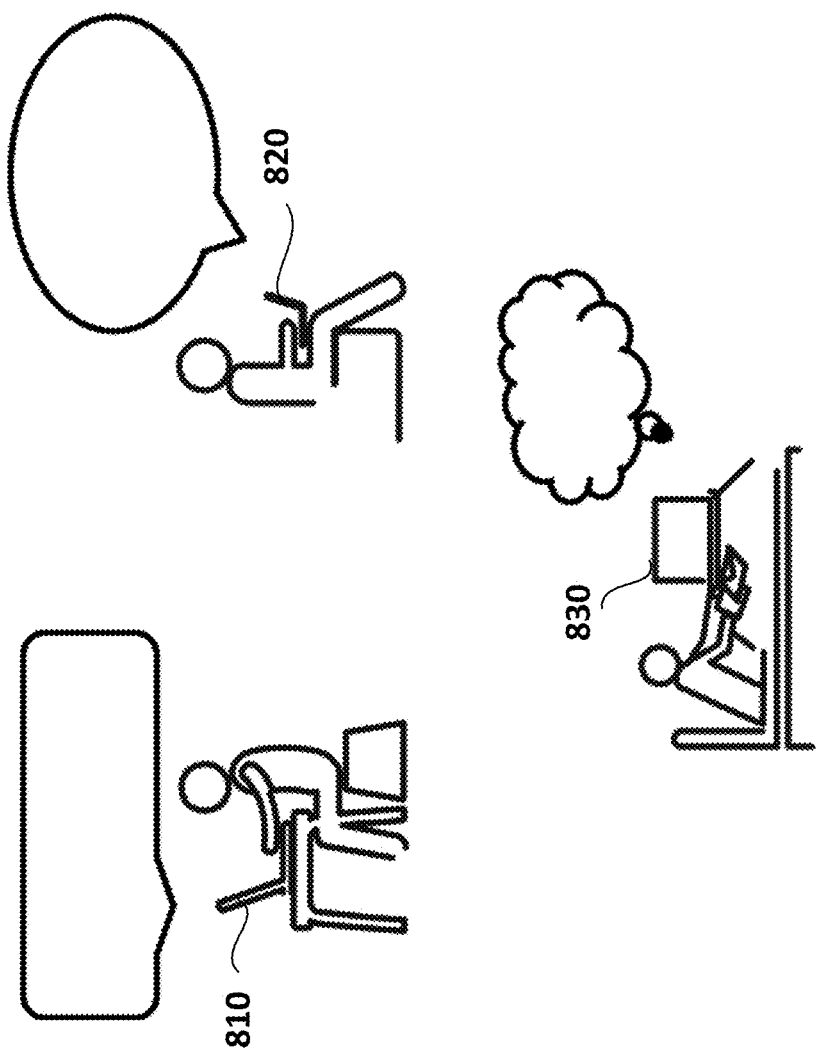

SYSTEMS AND METHODS FOR VIRTUAL PROGRAMMING BY ARTIFICIAL INTELLIGENCE

PRIORITY APPLICATION

This non-provisional application claims the benefit of priority of U.S. Provisional Patent Application No. 62/810,103, filed on Feb. 25, 2019, which is hereby incorporated herein by reference in its entirety.

DEFINITIONS/ABBREVIATIONS

The definitions and abbreviations used herein are provided as follows:

"OPENNLP" is the APACHE OPENNLP library, which is a machine learning based toolkit for the processing of natural language text. It supports the most common NLP tasks, such as language detection, tokenization, sentence segmentation, part-of-speech tagging, named entity extraction, chunking, parsing and reference resolution.

"TODO" is a computer programming tag placed in a comment to indicate that something more is required. TODO is a comment rather than a keyword.

"Neural Network" is either a system software or hardware that works similar to the tasks performed by neurons of human brain. Neural networks include various technologies like deep learning, and machine learning as a part of artificial intelligence ("AI").

"NLU" stands for Natural Language Understanding.

"Metadata" is data that provides information about other data (i.e., data about data). The metadata as used herein includes descriptive metadata, structural metadata, administrative metadata, reference metadata and statistical metadata.

"Repository", in software development, is a central file storage location.

"Natural language processing" (or "NLP" is a subfield of linguistics, computer science, information engineering, and artificial intelligence concerned with the interactions between computers and human (natural) languages, in particular how to program computers to process and analyze large amounts of natural language data.

"Sentiment analysis", also referred to as opinion mining or emotion AI, refers to the use of natural language processing, text analysis, computational linguistics, and biometrics to systematically identify, extract, quantify, and study affective states and subjective information.

FIELD OF INVENTION

Embodiments of the present invention are generally directed to systems and methods for generating a computer program using artificial intelligence.

BACKGROUND

In a typical software development process, a software developer starts with an understanding of requirements for the software to be developed. Based on the requirements, the software developer creates the software, and implements the software to achieve desired functionality. In software development, the software developer can rely on similar implementations and/or one's own knowledge.

Generally, the goal of a software development process is to create an output programming language based on the requirements, which are usually written in a natural human communication language (such as English, French, Hindi, German or any other language). Upon gaining an understanding of the intended meaning of the text, the software developer creates logic in a programming language, so that the output programming language achieves an expected result and/or functionality. The process is usually performed manually, and therefore, can be repetitive and time consuming. Furthermore, additional time and/or effort is spent by the software developer to understand a reference logic in one programming language and develop an equivalent logic in another programming language.

SUMMARY

In an embodiment, a method of generating a computer program using artificial intelligence includes generating, at an artificial intelligence module, logic programming by analyzing natural language in sample input data received from an external source, the sample input data resulting in a known output; receiving select input data, the select input data including select natural language or a coding instruction including the select natural language; generating context data by processing, using an artificial neural network of the artificial intelligence module, the select natural language; selecting the logic programming based on the context data; determining, at the artificial intelligence module, a computing instruction for the select input data using the logic programming; and generating the computer program, the computer program including the computing instruction.

In an embodiment, the method further comprises storing the logic programming in a knowledge repository; receiving process input data, the process input data being a result of the computing instruction, and the process input data including the select natural language or the coding instruction including the select natural language; generating process context data by processing, at the artificial intelligence module, the select natural language in the process input data; generating additional logic programming based on a comparison between the process context data and the context data; and storing the additional logic programming in the knowledge repository.

In an embodiment, the method further comprises storing the logic programming in a knowledge repository; and receiving subsequent input data, the subsequent input data including the select natural language or the coding instruction including the select natural language, and the subsequent input data being different from the select input data; generating subsequent context data by processing, at the artificial intelligence module, the select natural language in the subsequent input data; retrieving the logic programming from the knowledge repository based on a comparison between the subsequent context data and the context data; and determining, at the artificial intelligence module, a subsequent computing instruction for the subsequent input data using the logic programming; and updating the computer program to include the subsequent computing instruction.

In an embodiment, the select input data is encoded in a first logic programming language, and the logic programming is encoded in a second logic programming language, the second logic programming language being different than the first logic programming language.

In an embodiment, the generating of the context data includes creating metadata for the select input data by performing, using a natural language processing module, at least one of sentiment analysis, sentence recognition, relationship extraction or language detection; and generating the context data using the metadata.

In an embodiment, the method further comprises storing the logic programming in a knowledge repository; receiving initial input data, the initial input data including natural language or a coding instruction including the natural language; generating context data by processing, at the artificial intelligence module, the natural language; identifying select data in the context data, the select data including the natural language or the coding instruction including the natural language; generating select context data by processing, at the artificial intelligence module, the natural language in the select data; generating, at the artificial intelligence module, select logic programming for the select context data, the generating of the select logic programming being based on the logic programming; determining, at the artificial intelligence module, a select computing instruction for the select data using the select logic programming; and generating a select computer program, the select computer program including the select computing instruction.

In an embodiment, the method further comprises storing the select logic programming in the knowledge repository; and receiving subsequent input data, the subsequent input data including the natural language or the coding instruction including the natural language, and the subsequent input data being different from the select data; generating subsequent context data by processing, at the artificial intelligence module, the natural language in the subsequent input data; retrieving the select logic programming from the knowledge repository based on a comparison between the subsequent context data and the select context data; and determining, at the artificial intelligence module, a subsequent computing instruction for the subsequent input data using the select logic programming; and updating the select computer program to include the subsequent computing instruction.

In an embodiment, the initial input data and the select data are encoded in a first logic programming language, and the logic programming is encoded in a second logic programming language, the second logic programming language being different than the first logic programming language.

In an embodiment, a system for generating a computer program using artificial intelligence includes a processor; and a memory storing a program for execution by the processor, the program including instructions for generating, at an artificial intelligence module, logic programming by analyzing natural language in sample input data received from an external source, the sample input data resulting in a known output; receiving select input data, the select input data including select natural language or a coding instruction including the select natural language; generating context data by processing, at the artificial intelligence module, the select natural language; selecting the logic programming based on the context data; determining, at the artificial intelligence module, a computing instruction for the select input data using the logic programming; and generating the computer program, the computer program including the computing instruction.

In an embodiment, the program includes instructions for storing the logic programming in a knowledge repository; receiving process input data, the process input data being a result of the computing instruction, and the process input data including the select natural language or the coding instruction including the select natural language; generating process context data by processing, at the artificial intelligence module, the select natural language in the process input data; generating additional logic programming based on a comparison between the process context data and the context data; and storing the additional logic programming in the knowledge repository.

In an embodiment, the program includes instructions for storing the logic programming in a knowledge repository; and receiving subsequent input data, the subsequent input data including the select natural language or the coding instruction including the select natural language, and the subsequent input data being different from the select input data; generating subsequent context data by processing, at the artificial intelligence module, the select natural language in the subsequent input data; retrieving the logic programming from the knowledge repository based on a comparison between the subsequent context data and the context data; and determining, at the artificial intelligence module, a subsequent computing instruction for the subsequent input data using the logic programming; and updating the computer program to include the subsequent computing instruction.

In an embodiment, the select input data is encoded in a first logic programming language, and the logic programming is encoded in a second logic programming language, the second logic programming language being different than the first logic programming language.

In an embodiment, the generating of the select context data includes creating metadata for the select input data by performing, using a natural language processing module, at least one of sentiment analysis, sentence recognition, relationship extraction or language detection; and generating the context data using the metadata.

In an embodiment, the program includes instructions for storing the logic programming in a knowledge repository; receiving initial input data, the initial input data including natural language or a coding instruction including the natural language; generating context data by processing, at an the artificial intelligence module, the natural language; identifying select data in the context data, the select data including the natural language or the instruction including the natural language; generating select context data by processing, at the artificial intelligence module, the natural language in the select data; generating, at the artificial intelligence module, select logic programming for the select context data, the generating of the select logic programming being based on the logic programming; determining, at the artificial intelligence module, a select computing instruction for the select data using the select logic programming; and generating a select computer program, the select computer program including the select computing instruction.

In an embodiment, the instructions further comprise storing the select logic programming in the knowledge repository; and receiving subsequent input data, the subsequent input data including the natural language or the coding instruction including the natural language, and the subsequent input data being different from the select data; generating subsequent context data by processing, at the artificial intelligence module, the natural language in the subsequent input data; retrieving the select logic programming from the knowledge repository based on a comparison between the subsequent context data and the select context data; and determining, at the artificial intelligence module, a subsequent computing instruction for the subsequent input data using the select logic programming; and updating the select computer program to include the subsequent computing instruction.

In an embodiment, the initial input data and the select data are encoded in a first logic programming language, and the logic programming is encoded in a second logic programming language, the second logic programming language being different than the first logic programming language.

In an embodiment, a non-transitory computer readable medium having instructions embodied thereon that, when executed by a processor, cause the processor to perform operations including generating, at an artificial intelligence module, logic programming by analyzing natural language in sample input data received from an external source, the sample input data resulting in a known output; receiving select input data, the select input data including select natural language or a coding instruction including the select natural language; generating context data by processing, at the artificial intelligence module, the select natural language; selecting the logic programming based on the context data; determining, at the artificial intelligence module, a computing instruction for the select input data using the logic programming; and generating the computer program, the computer program including the computing instruction.

In an embodiment, the operations further comprise storing the logic programming in a knowledge repository; receiving process input data, the process input data being a result of the computing instruction, and the process input data including the select natural language or the coding instruction including the select natural language; generating process context data by processing, at the artificial intelligence module, the select natural language in the process input data; generating additional logic programming based on a comparison between the process context data and the context data; and storing the additional logic programming in the knowledge repository.

In an embodiment, the operations further comprise storing the logic programming in a knowledge repository (a "repository", in software development, is a central file storage location); and receiving subsequent input data, the subsequent input data including the select natural language or the coding instruction including the select natural language, and the subsequent input data being different from the select input data; generating subsequent context data by processing, at the artificial intelligence module, the select natural language in the subsequent input data; retrieving the logic programming from the knowledge repository based on a comparison between the subsequent context data and the context data; and determining, at the artificial intelligence module, a subsequent computing instruction for the subsequent input data using the logic programming; and updating the computer program to include the subsequent computing instruction.

In an embodiment, the select input data is encoded in a first logic programming language, and the logic programming is encoded in a second logic programming language, the second logic programming language being different than the first logic programming language.

In an embodiment, the generating of the context data includes creating metadata for the select input data by performing, using a natural language processing module, at least one of sentiment analysis, sentence recognition, relationship extraction or language detection; and generating the context data using the metadata.

Metadata" is data that provides information about other data (i.e., data about data). The metadata as used herein includes descriptive metadata, structural metadata, administrative metadata, reference metadata and statistical metadata.

In an embodiment, the operations further include storing the logic programming in a knowledge repository; receiving initial input data, the initial input data including natural language or a coding instruction including the natural language; generating context data by processing, at the artificial intelligence module, the natural language; identifying select data in the context data, the select data including the natural language or the coding instruction including the natural language; generating select context data by processing, at the artificial intelligence module, the natural language in the select data; generating, at the artificial intelligence module, select logic programming for the select context data, the generating of the select logic programming being based on the logic programming; determining, at the artificial intelligence module, a select computing instruction for the select data using the select logic programming; and generating a select computer program, the select computer program including the select computing instruction.

In an embodiment, the operations further comprise storing the logic programming in the knowledge repository; and receiving subsequent input data, the subsequent input data including the natural language or the coding instruction including the natural language, and the subsequent input data being different from the select data; generating subsequent context data by processing, at the artificial intelligence module, the natural language in the subsequent input data; retrieving the select logic programming from the knowledge repository based on a comparison between the subsequent context data and the select context data; and determining, at the artificial intelligence module, a subsequent computing instruction for the subsequent input data using the select logic programming; and updating the select computer program to include the subsequent computing instruction.

In an embodiment, the initial input data and the select data are encoded in a first logic programming language, and the logic programming is encoded in a second logic programming language, the second logic programming language being different than the first logic programming language.

BRIEF DESCRIPTION OF THE DRAWINGS

Embodiments will be more clearly understood from the following detailed description taken in conjunction with the accompanying drawings. FIGS. 1-11 represent non-limiting, embodiments as described herein.

FIGS. 2 and 4 are flow diagrams of communication along an input communication channel of an artificial intelligence module in accordance with embodiments.

FIG. 3 is a neural network in accordance with an embodiment.

FIG. 5 is a flow diagram of learning from a natural human language by an artificial intelligence module in accordance with an embodiment.

FIG. 6 is a flow diagram of supervised learning by an artificial intelligence module in accordance with an embodiment.

FIG. 7 is a flow diagram of unsupervised learning by an artificial intelligence module in accordance with an embodiment.

FIG. 8 is a diagram illustrating artificial intelligence modules working in isolation in accordance with an embodiment.

FIG. 10 is a diagram illustrating artificial intelligence modules functioning as a swarm in accordance with an embodiment.

FIG. 11 is a block diagram of an electronic device in accordance with an embodiment.

DETAILED DESCRIPTION

Figure 1A:
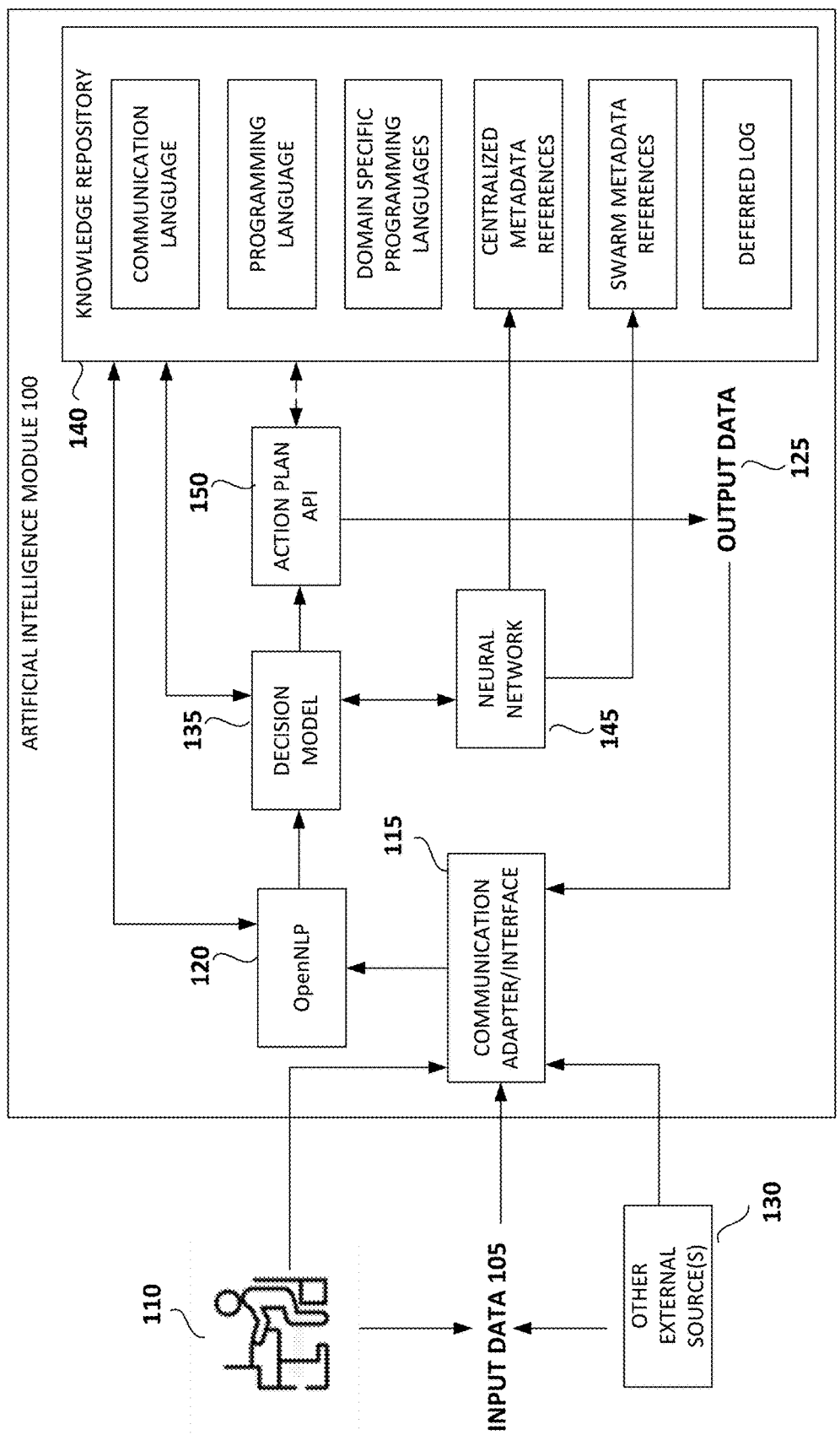
FIG. 1A is a diagram of a system of generating computer programming using artificial intelligence in accordance with an embodiment.

Embodiments of the present invention are generally directed to systems and methods for generating a computer program using artificial intelligence ("AI") (also referred to as "machine intelligence").

AI, as used herein, is machine-learning or intelligence demonstrated by one or more machines to correctly interpret and learn from external data, and to use the learned information to achieve a specific goal and/or task through flexible adaptation. AI, as used herein, involves the use of algorithms, particularly, AI algorithms that improve by learning from the external data using heuristics. AI can use any one of the following to solve a problem: search and optimization (using swarm intelligence), logic (including first-order logic, propositional logic, fuzzy set theory), probabilistic (using Bayesian networks, Kalman filters, Markov models), classifiers, controllers, artificial neural networks (including deep feedforward neural networks), deep recurrent neural networks, and evaluation. The AI functionality can be provided by an AI computer module (referred to herein as "AI Virtual Programmer").

In an embodiment, the AI Virtual Programmer can be an intelligent virtual assistant (also referred to as "intelligent personal assistant") or a software agent that assists an individual (e.g., a software developer) with developing code in the various programming languages based on specific requirement(s). The AI Virtual Programmer understands programming languages, such as Java, C#, JavaScript, C, C++, Python, VB .NET, R, PHP, MATLAB and other programming languages. The AI Virtual Programmer also helps an individual with recurring programming tasks.

In an embodiment, the AI Virtual Programmer can operate independently to develop code in the various programming languages based on specific requirement(s) without assistance from an external control or an individual.

The AI Virtual Programmer can read and understand natural human languages such as English, French, Hindi, German or any other language. The AI Virtual Programmer can be programmed to read and understand any natural human language. By being able to understanding the natural human language, the AI Virtual Programmer can communicate with, and assist, an individual in the natural human language. Similarly, the AI Virtual Programmer can also understand the programming languages and helps an individual in programming.

The AI virtual programmer can self-learn various programming techniques through supervised or unsupervised learning. As previously mentioned, the AI Virtual Programmer can become more "intelligent" using heuristics and similar techniques over a period of time, resulting in more productive programming over time.

The systems and methods of generating a computer program using the AI Virtual Programmer according to embodiments may be used to efficiently resolve and perform repetitive programming tasks, by reducing or eliminating the time and/or effort generally spent by an individual to complete the same. The AI Virtual Programmer performs programming tasks more quickly than the individual, thereby significantly improving productivity.

FIG. 1A is a diagram of a system of generating computer program using artificial intelligence in accordance with an embodiment.

Referring to FIG. 1A, a system for generating a computer program using artificial intelligence includes a processor; and a memory storing a program for execution by the processor. The program includes instructions for generating, at an artificial intelligence ("AI") module 100, logic programming by analyzing natural language in input data 105. Input data 105 can be received from one or more external source(s) 130 (e.g., applications and/or tools), input data 105 can be received from a computing device associated with an individual 110 (e.g., a software developer), and/or other input (e.g., coding instructions) from the computing device associated with the individual 110. Input data 105 can be sample input data that results in a known software source code output. Alternatively, input data 105 can be select input data or subsequent input data that results in an objectionable software source code output, an undesired software source code output or an unknown software source code output. In yet another embodiment, input data 105 can be process input data that results in a target or desired software source code output. Input data 105 can include natural human language.

In an embodiment, input data 105 can include of various types of data such as natural human language, code fragment, a file, a file path, selected code, a TODO including natural language, a source code defect (e.g., in a test result), a WORD file, a PDF file, a XLS file, an email, an embedded message, or combinations thereof.

Artificial intelligence module 100 can interact with the computing device associated with the individual 110, receive input data 105 from external source(s) 130, select external source(s) 130 for providing input data 105, and/or retrieve input data 105 based on the occurrence of one or more external events (e.g., a specific task, step or implementation of a coding instruction). Artificial intelligence module 100 can generate and capture input data 105 from one or more external source(s) 130 by identifying one or more events that occur at external source(s) 130.

There can be various types and quantities of input data 105. Artificial intelligence module 100 can receive input data 105 in one or more formats and/or programming languages. To receive the input data 105 from external source(s) 130, artificial intelligence module 100 is configured to communicate with the external source(s) 130. Artificial intelligence module 100 can communicate with the external source(s) 130 through an application program interface ("API") provided by the respective external source(s) 130 (such as JIRA, Bugzilla or a similar software application) in order to communicate with the external source(s) 130. An API is an interface which performs predefined tasks based on input.

In an embodiment, artificial intelligence module 100 can provide recommendations and/or suggestions for the input data 105. For instance, artificial intelligence module 100 can recommend one or more types of fixes/solutions to resolve a given issue with software source code in the input data 105. Artificial intelligence module 100 can suggest, for instance, that a portion of the software source code in the input data 105 be fixed, or an entirety of the software source code in the input data 105 be fixed.

In an embodiment, artificial intelligence module 100 can output a solution for resolving a given issue with the input data 105. The solution provided by artificial intelligence module 100 is determined based on the nature of the input data 105.

Artificial intelligence module 100 can communicate with the computing device associated with the individual 110 and/or external source(s) 130 through a communication adaptor/interface 115. Communication adapter 115 can communicate with external source(s) 130 (e.g., software applications such as JIRA, Bugzilla or similar applications) through a software connector (e.g., API) provided by the external source(s) 130. Communication adapter 115 receives input data 105, and then transmits the input data 105 to an OPENNLP module 120 for further processing. Upon receiving output data 125, communication adapter 115 transmits the output data 125 to individual 110 and/or external source(s) 130.

In an embodiment, a supporting software connector can be installed on artificial intelligence module 100 so that the artificial intelligence module 100 can interact with external source(s) 130.

In an embodiment, communication adapter 115 can interact with only individual 110, only external source(s) 130, or both individual 110 and external source(s) 130 through different input communication channels.

In an embodiment, the input communication channel can include a user interface or a chat/messaging box configured to receive coding instruction(s) from individual 110 and/or input data 105 from external source(s) 130 or the computing device associated with the individual 110. The input communication channel may include an interactive messaging box, which appears during an event.

Figure 1B:
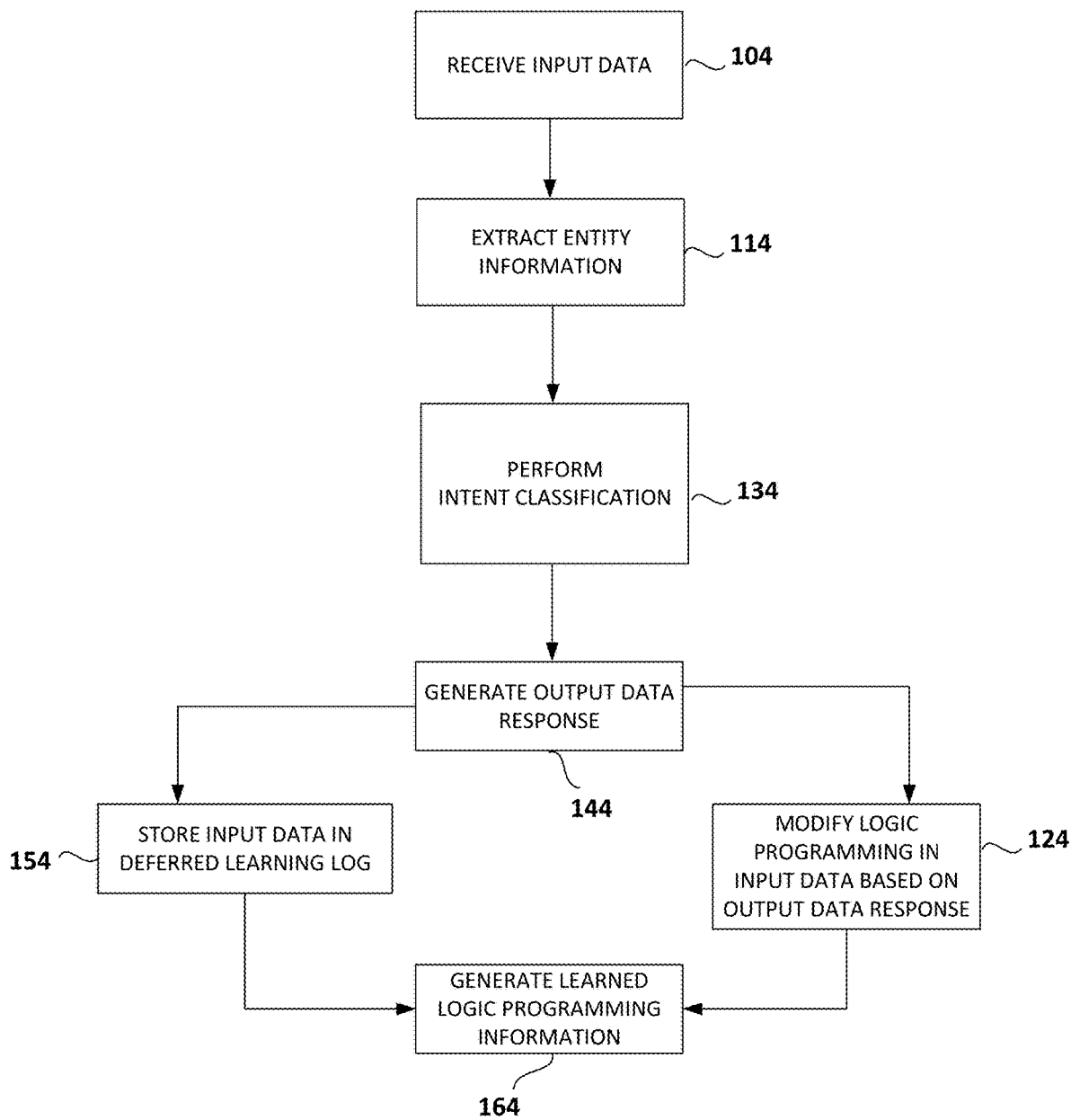
FIG. 1B is a flow diagram of input data processing using artificial intelligence in accordance with an embodiment.

FIG. 1B is a flow diagram of input data processing using artificial intelligence in accordance with an embodiment.

Referring to FIG. 1B, input data is received by the artificial intelligence module from an individual and/or one or more external sources, at 104. The input data includes natural human language.

In an embodiment, the input data can be a set of program files (referred to as an "inventory") uploaded to the artificial intelligence module from the one or more external sources and/or the individual. The inventory can include with multiple data files.

At 114, entity information is extracted from logic programming and natural human language in the input data by categorizing and identifying variables, functions and other components of the input data. Extraction of entity information includes generating context data by processing, at the artificial intelligence module, the natural human language. For instance, in an embodiment, artificial intelligence module extracts entity information from java programs by parsing the input data into known java categories by processing the natural human language in the input data, and identifying variables, functions and other components in the input data.

At 134, the artificial intelligence module determines the validity of entity information extracted from the input data, and classifies relevant portions of the input data based on intent, thus generating metadata for the input data. For instance, generating the metadata includes generating context data and references from the classified portions of the input data.

At 144, the artificial intelligence module generates an output data response by selecting logic programming, using a neural network and information from a knowledge repository, for rectifying logic programming in the input data based on the context data and references. Generating the output data response includes determining, at the artificial intelligence module, a computing instruction for the input data using logic programming in the knowledge repository, and generating the computer program, the computer program including the computing instruction.

In an embodiment, the artificial intelligence module provides the output data response to an individual (e.g., a software programmer).

If the output data response generated by the artificial intelligence module is not acceptable, the artificial intelligence module stores the input data in a deferred learning log, at 154.

If the output data response generated by the artificial intelligence module is acceptable, the artificial intelligence module modifies the logic programming in the input data using the output data response, at 124.

At 164, the artificial intelligence module generates learned logic programming information by "learning" from the generation of the output data response, and updates the knowledge repository with the learned logic programming information. Artificial intelligence module can also update the deferred learning log with the learned logic programming information in order to resolve stored output data responses that the learned logic programming information may be applied to.

Figure 2:
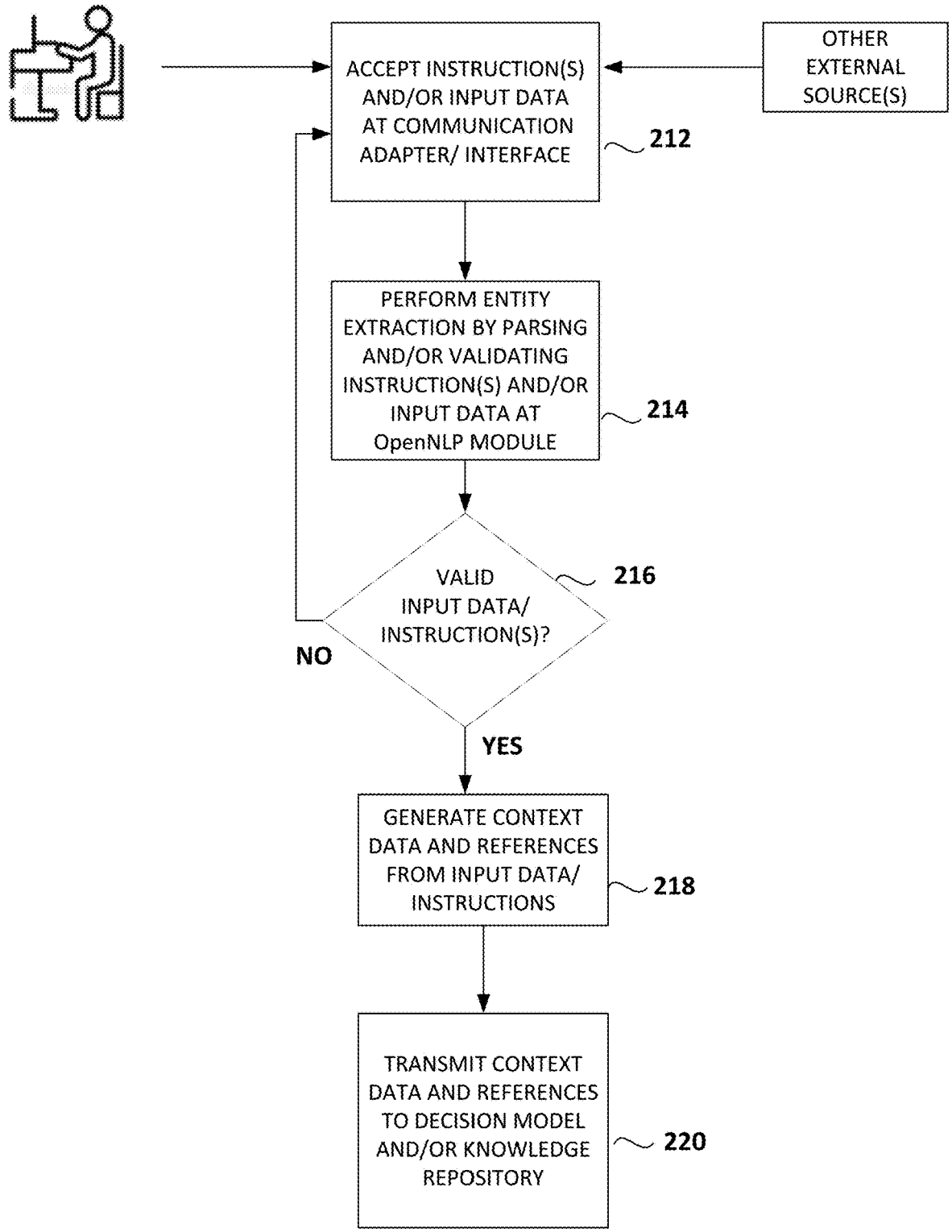

FIG. 2 is a flow diagram of communication along an input communication channel of the artificial intelligence module in accordance with an embodiment.

Referring to FIG. 2, one or more coding or coding-related instructions (or tasks) from an individual (e.g., a software developer) is received at a user interface of an artificial intelligence module, at 212. The coding instruction(s) can include natural human language, programming language or a combination of the natural human language and the programming language. The coding instruction(s) can include a "TODO" computer programing tag, for instance. A TODO is a computer programming tag placed in a comment to indicate that something more is required. For instance, the TODO tag can indicate that a piece of software source code did not get converted during an automated code conversion process. A TODO tag can be added by an automated programming tool to flag portions (e.g., software source code) of the input data that were not programmable during automation and therefore need to be addressed and/or fixed.

Referring to both FIGS. 1 and 2, context data is generated by processing the natural human language in input data 105 and/or coding instruction(s) from a computing device associated with an individual 110. In an embodiment, communication adapter 115 transmits input data 105 and/or coding instruction(s) from the computing device associated with the individual 110 to OPENNLP 120 for entity extraction by validation and/or parsing, at 214.

At 216, if valid, then OPENNLP 120 generates context data from the instructions and/or input data 105. If invalid, then a correction request is sent via communication adapter 115 to the computing device associated with the individual 110 and/or external source(s) 130 to provide valid input data. The correction request can be in the form of the natural human language used in input data 105 and/or the instructions received from the computing device associated with the individual 110. For example, if input data 105 and/or the instruction(s) are invalid, then communication adapter 115 transmits a validation message such as "provide correct the input message format" or "invalid input message format" to the computing device associated with the individual 110.

OPENNLP 120 is a natural language parser that can extract sentence structure and/or phrases from the natural human language in input data 105 and/or the coding instruction(s) received from the computing device associated with the individual 110. OPENNLP 120 also supports other natural language processing ("NLP") tasks such language detection, tokenization, sentence segmentation, part-of-speech tagging, named entity extraction, chunking, parsing and reference resolution.

In an embodiment, OPENNLP 120 is configured to analyze input data 105 and/or the coding instruction(s) from the computing device associated with the individual 110, and generate/build context data, at 218. OPENNLP 120 is configured to resolve structural ambiguity of the natural human language in input data 105, and identify phrases and structure of phrases in the natural human language.

Based on the analysis of input data 105, OPENNLP 120 generates context data by processing input data 105 and/or the coding instruction(s) from the computing device associated with the individual 110, and in particular, based on the natural human language in input data 105 and/or the coding instruction(s) from the computing device associated with the individual 110. Context data is data containing a group of similar and/or related references for specific keyword(s). If input data 105 has been received from more than one external source, OPENNLP 120 then parses input data 105 received from a subsequent external source, after parsing input data 105 received from a first external source.

In an embodiment, OPENNLP 120 can have contextual awareness built and configured in a language processing model. With contextual awareness, OPENNLP 120 extracts one or more contexts from input data 105 and/or the coding instruction(s) from the computing device associated with the individual 110.

In an embodiment, OPENNLP 120 is configured to identify different references in input data 105 and/or the coding instruction(s) from the computing device associated with the individual 110. Based on the identified references, OPENNLP 120 is further configured to determine a reference chain around the context(s) in an upward direction (i.e., preceding the context(s)) and a downward direction (i.e., following the context(s)). For example, if input data 105 include one or more TODO line(s) in computer business-oriented language ("COBOL"), then OPENNLP 120 analyzes input data 105 to identify a specific TODO line, and references preceding and following the specific TODO line. OPENNLP 120 can analyze the reference chain for the specific TODO line based on the references. OPENNLP 120 can analyze additional reference(s) that are referred to in the references preceding and following the specific TODO line.

Based on the context data provided by OPENNLP 120, artificial intelligence module 100 is configured to understand the natural human language, and use the natural human language for communication with the computing device associated with the individual 110 and/or external source(s) 130. Artificial intelligence module 100 is configured to communicate using natural human language, for instance, as included in input data 105 or in any other natural human language.

At 220, OPENNLP 120 transmits the context data, references and/or a natural language processing summary (including language semantics) to a knowledge repository 140 for storage and/or a Decision Model 135 for determining a specific action item (e.g., a computing instruction).

Referring back to FIG. 1A, Decision Model 135 is configured to receive the context data and references from OPENNLP 120. Decision Model 135 is also configured to receive metadata for the context data and/or references. For instance, the metadata can contain information such as how many different references are involved in input data 105 and/or the coding instruction(s) from the computing device associated with the individual 110, the relation of specific keywords in input data 105 and/or the coding instruction(s) from the computing device associated with the individual 110, how specific keywords are related with a reference (within and/or excluded from input data 105 and/or the coding instruction(s) from the computing device associated with the individual 110).

Metadata" is data that provides information about other data (i.e., data about data). The metadata as used herein includes descriptive metadata, structural metadata, administrative metadata, reference metadata and statistical metadata.

The information received from OPENNLP 120 can contain different contexts. The information received from OPENNLP 120 can include, for instance, domain, natural language, technology related information and/or programming language information. Decision Model 135 is configured to arrange input data 105 in a logical manner, and select an appropriate action or logic programming for resolving the given issue with software source code in the input data 105 or the coding instruction received from the computing device associated with the individual 110.

In an embodiment, using (i) training data received from knowledge repository 140 and (ii) the context data, the references, the natural language processing summary and/or the metadata received from OPENNLP 120, Decision Model 135 is configured to search for logic programming area(s) that will likely resolve the given issue. The training data received from knowledge repository 140 includes training data of the multiple programming languages. Knowledge repository 140 also includes information associated with the natural human language communication, languages semantics, programming languages references, domain specific contexts, programming language contextual trained data, metadata and other references (such as references required for the communication and to make decisions).

Upon identifying the logic programming area(s), Decision Model 135 transmits the logic programming area(s) to a neural network 145 or Action Plan API 150, along with the context data, the references, the natural language processing summary and/or the metadata received from OPENNLP 120.

In an embodiment, neural network 145 determines one or more probable solutions by mapping information (such as logic programming areas, the context data, the references, the natural language processing summary and/or the metadata) in a data signal to the probable solution(s). Neural network 145 (also referred to as an "artificial neural network") provides a "learning" functionality to artificial intelligence module 100 by classifying, grouping and/or extracting features using algorithms. Using neural network 145, artificial intelligence module 100 is configured to learn how to perform task(s) from examples and/or previously-learned information (e.g., computing instruction(s) or logic programming). Using neural network 145, artificial intelligence module 100 is configured to learn without being programmed with a task-specific rule.

Figure 3:
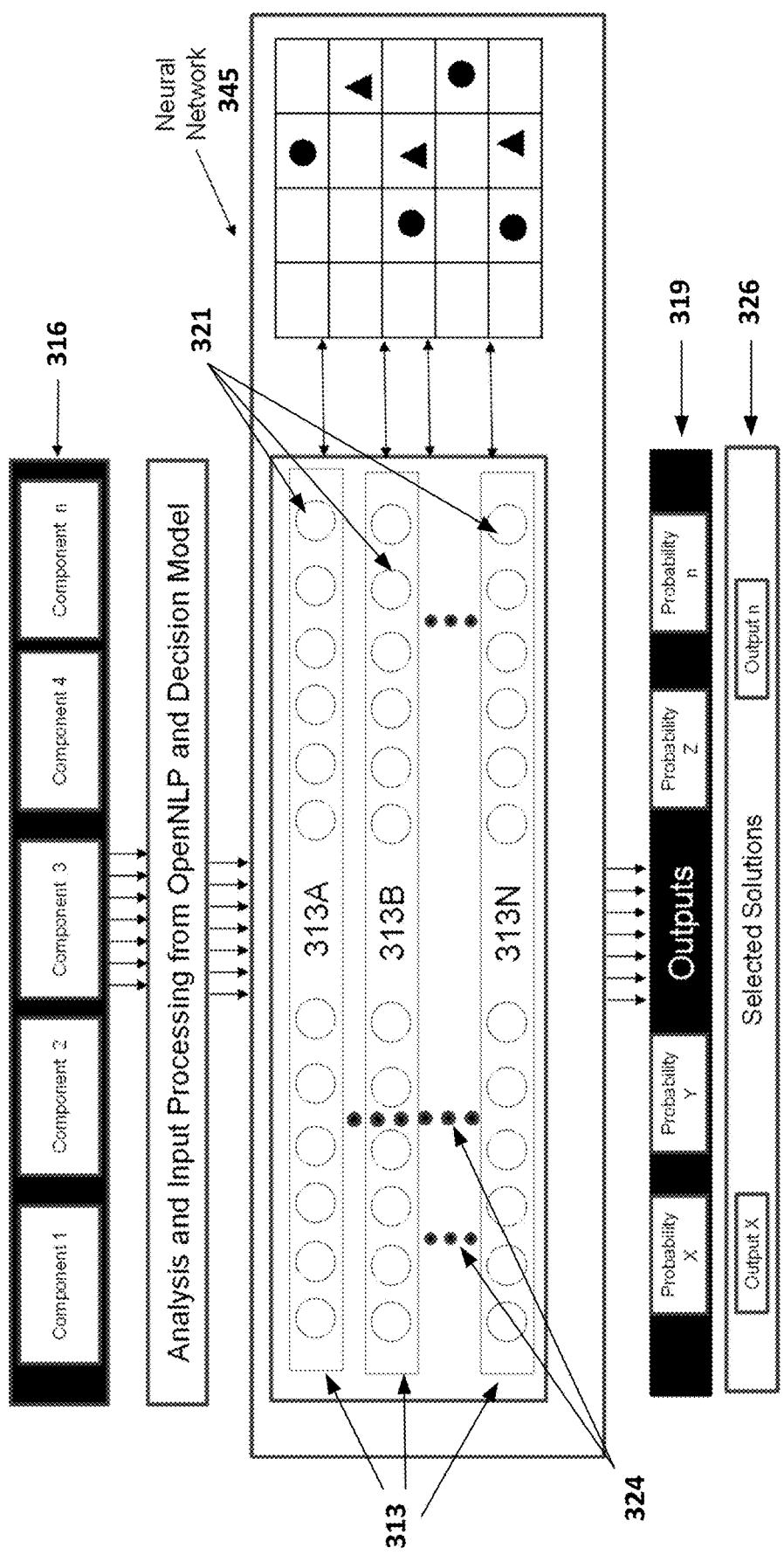

FIG. 3 is a neural network in accordance with an embodiment.

Referring to FIG. 3, neural network 345 includes one or more tiers or layers 313. Tiers 313 can include an input layer 313A, an output layer 313N, and, optionally, one or more hidden layers 313B. From one or more components 316 (e.g., a computing device associated with an individual 110 and/or external source(s) 130), input layer 313A is configured to receive various forms of information that neural network 345 attempts to learn about, recognize or otherwise process. Output layer 313N is configured to output one or more probable solutions 319 to the information learned by neural network 345. Hidden layer(s) 313B, which are between input layer 313A and output layer 313N, are configured to learn about, recognize or otherwise process information received from input layer 313A.

An input layer of a neural network is composed of artificial input neurons, and receives (or retrieves) initial data into the AI system for further processing by subsequent layers of artificial neurons. The input layer is the very beginning of the workflow for the artificial neural network.

An output layer of a neural network is the last layer of artificial neurons that produces given outputs for the program.

Each tier 313 contains neurons 321 (also referred to as "artificial neurons") that receive input data signal(s) from neurons 321 in a preceding tier, apply an algorithm function to the input data signal(s), and generate an output data signal. The output data signal may be transmitted to neurons 321 in subsequent tier via dendrites 324.

Neurons (or "artificial neurons") as used herein are mathematical functions modeled similar to biological neurons of a biological neural network. Generally, in a neuron, each input of data is separately weighted, and the sum is passed through a non-linear function known as an activation function or transfer function.

In an embodiment, input layer 313A contains neurons 321 that are configured to receive an input data signal (containing logic programming areas, the context data, the references, the natural language processing summary and/or the metadata) from Decision Model 135, apply an algorithm function to the input data signal to generate a modified data signal, and transmit the modified data signal to either hidden layer(s) 313B or output layer 313N. The data signal received by input layer 313A can be generated in response to input data received from one or more components 316 via OPENNLP 120 and Decision Model 135.

Decision Model is an intellectual template for perceiving, organizing, and managing the business logic behind a business decision.

In an embodiment, hidden layer(s) 313B contains neurons 321 that are configured to receive an input data signal from input layer 313A, apply an algorithm function to the input data signal to generate a modified data signal, and transmit the modified data signal to output layer 313N.

In machine learning, an algorithm function is a set of rules or instructions given to an AI module, a neural network, system or machine to help it learn on its own.

In an embodiment, hidden layer(s) 313B can collectively form a majority of neural network 345. However, there is no limit on the number of hidden layer(s) 313B.

In an embodiment, neural network 345 can adjust one or more hidden layer(s) 313B if the modified data signal does not, or alternatively, would not, match an expected output. For instance, as the complexity in the relationship between the input data and the desired output increases, the number of the processing hidden layers can also be increased.

In an embodiment, output layer 313N contains neurons 321 that are configured to receive an input data signal from input layer 313A or hidden layer(s) 313B, and output one or more probable solutions 319 for responding to the information contained in the data signal.

In an embodiment, neural network 345 includes only input layer 313A and output layer 313N, and no hidden layers 313B.

In an embodiment, each neuron 321 can have a weight indicative of relative importance of the algorithm functionality of neuron 321 to learning how to map the input data to the output data. Alternatively, or in addition, each dendrite 324 can have a weight indicative of relative importance of the algorithm functionality of one or more corresponding neurons 321 to a learning model of how to map the input data to the output data. The weight can adjust as learning proceeds to improve accuracy of determining probable solutions 319.

In an embodiment, neural network 345 can use a back-propagation algorithm to adjust the weight to compensate for errors found during the learning. The backpropagation algorithm calculates a gradient of a loss function associated with a given state with respect to the weight.

A backpropagation algorithm is an algorithm used to calculate derivatives quickly. Artificial neural networks use the backpropagation algorithm as a learning algorithm to compute a gradient descent with respect to weights.

In an embodiment, neural network 345 can use a sigmoid function to introduce nonlinearity in the learning model. Neural network 345 can compute a linear combination of input data signals, and apply the sigmoid function to the result.

A sigmoid function is generally used in an artificial neural network to introduce nonlinearity in a model. A neural network element computes a linear combination of its input signals, and applies a sigmoid function to the result. Sigmoid functions including the logistic function and the hyperbolic tangent function can be used as an activation function of an artificial neuron. The activation function defines the output of a neuron given input or set of inputs.

Probable solutions 319 output by neural network 345 can have different probabilities. One or more solutions 326 with the most favorable probabilities can be selected, and transmitted to Decision Model 135 and Action Plan API 150 to generate an action plan.

Referring back to FIG. 1A, Action Plan API 150 includes various programs (e.g., Java) available to generate the action plan by taking selected solutions from Decision Model 135. Using the programs in Action Plan API 150, Action Plan API 150 takes selected solutions from Decision Model 135, and refers to the metadata information in knowledge repository 140 to generate the action plan. The action plan is then transmitted to an output processing unit (not shown) for further processing. A "repository", in software development, is a central file storage location.

The output processing unit receives the action plan from Action Plan API 150, and formats and packages the action plan as output data 125. Output data 125 is then transferred to communication adaptor/interface 115 where it is sent to individual 110 and/or external source(s) 130.

In an exemplary embodiment, artificial intelligence module 100 receives the following TODO line as input data 105 coded in COBOL: //TODO: MOVE POB1-OP2 TO PHV-POB1-OP2. OPENNLP 120 reads and interprets the TODO line as follows:

"MOVE"—a MOVE instruction in COBOL,

"POB1-OP2"—a source from where the movement is happening,

"TO"—a MOVE statement format which contains source and target, and

"PHV-POB1-OP2"—target where source has to be moved.

COBOL is a compiled English-like computer programming language designed for business use. COBOL is procedural and object-oriented. COBOL is primarily used in business, finance, and administrative systems for companies and governments.

A MOVE statement is used to assign a value to a variable from another variable or literal.

At OpenNLP 120, artificial intelligence module 100 scans the COBOL language in input data 105 for references to the "POB1-OP2" source to understand the source element in input data 105. Artificial intelligence module 100 generates context data and references by determining input preceding the "POB1-OP2" source, input subsequent to the "POB1-OP2" source, and/or any input associated with the "POB1-OP2" source. By determining the preceding references, the subsequent references and the associated references, action items are identified. The process is repeated for the "PHV-POB1-OP2" target. Artificial intelligence module 100 sends all the context data and reference information obtained at OpenNLP 120 to Decision Model 135. Referencing the reference metadata from knowledge repository 140 and using neural network 145, Decision Model 135 determines one or more suitable solutions. Using the suitable solution(s), Action Plan API 150 determines an action plan that includes software source code for resolving the TODO fix. An output processing unit generates output data 125 by modifying input data 105 using the software source code, and transmits output data 125 to external source(s) 130 and/or individual 110.

Figure 4:
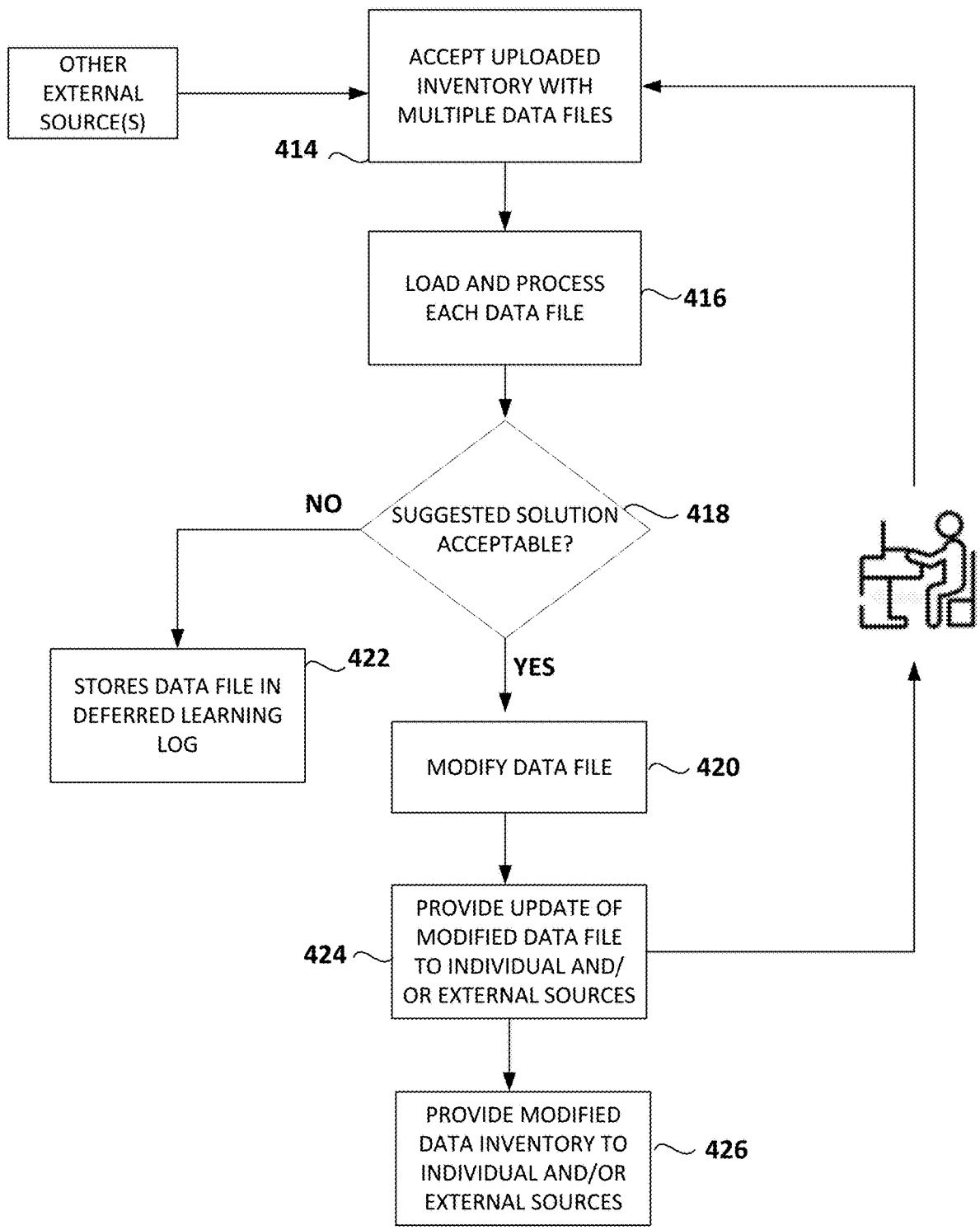

FIG. 4 is a flow diagram of communication along an input communication channel in accordance with another embodiment.

Referring to FIG. 4, a set of program files (referred to as an "inventory") is uploaded from one or more external sources or an individual, at 414. An inventory is a group of related programs. The inventory includes multiple data files.

At 416, artificial intelligence module loads, and processes, each data file in the inventory. Each data file is processed as discussed at steps 214, 216 and 218 of FIG. 2.

In an embodiment, the data files are loaded and processed one at a time.

At 418, artificial intelligence module presents one or more suggested solution(s) to the individual. The one or more suggested solution(s) are determined using a neural network and information from a knowledge repository.

If the suggested solution is not acceptable, artificial intelligence module stores the data file in a deferred learning log, at 422. The deferred learning log is available for review to a user. The deferred learning log includes detailed information about events that occur when the deferred learning log is generated. The detailed information can include information such as skill details, skill-variation, type of input used, type of output generated, what is the exact input, input parameters used for skill to generate the output and so on so forth. The detailed information can also include time, place and user information. Information about the generated output and the expected output, and any other suggestion entered by the user and other related information.

A learning log is a personalized learning resource for an artificial intelligence system.

Input parameters are the parameters that are transmitted to the artificial intelligence system and are used to generate programming logic.

In an embodiment, artificial intelligence module automatically generates a deferred learning log report including information about any stored deferred learning logs that need to be revisited and reviewed by the user.

If the suggested solution is acceptable, artificial intelligence module modifies the data file and provides a status update to the user through a user interface (for example, through chat box), at 424.

At 426, artificial intelligence module provides a modified data inventory to the user and/or the external sources.

Figure 5:
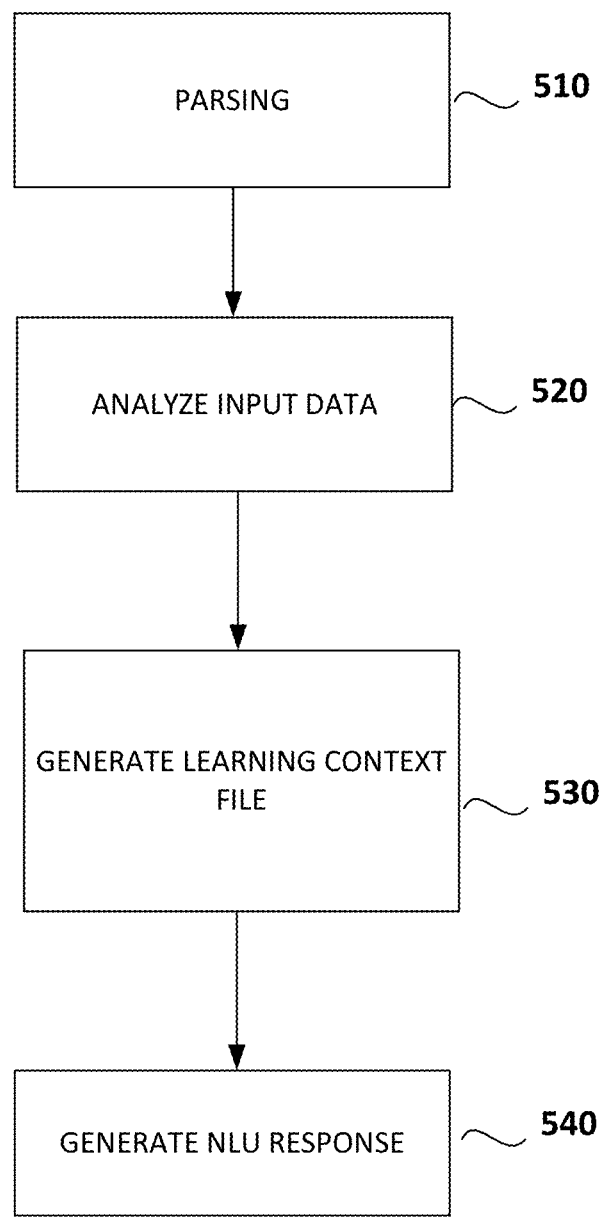

FIG. 5 is a flow diagram of learning from a natural human language by an artificial intelligence module in accordance with an embodiment.

A flow diagram is a collective term for a diagram representing a flow or set of dynamic relationships in a system.

Referring to FIG. 5, an OpenNLP of an artificial intelligence module parses natural human language in input data using natural language processing (NLP), at 510.

Using natural language processing and understanding application programming interface (API), the OpenNLP is configured to understand and interpret written human language and/or verbal human language. For the purpose of interpreting and understanding the natural human language, the artificial intelligence module is provided with pre-trained data of various conversations, speeches of the natural language from a knowledge repository. The NLP function performs tasks such as sentiment analysis, sentence recognition, and relationship extraction.

At 520, using the parsed natural human language and the learned logic programming information provided from a knowledge repository, the OpenNLP analyzes programming language in the input data. From analysis of the programming language in the input data, the OpenNLP extracts the intent of the natural human language using data from a knowledge repository.

Based on the analysis of the programming language, the OpenNLP generates a learning context file including context data and references, at 530.

At 540, the OpenNLP provides a response in a natural human language based on the learning context file. Then, the OpenNLP transmits the learning context file to a Decision Model and the knowledge repository.

From the learning context file from the OpenNLP and the selected solutions from a neural network, the knowledge repository "learns" and generates learned logic programming information. The learned logic programming information is stored in the knowledge repository.

Figure 6:
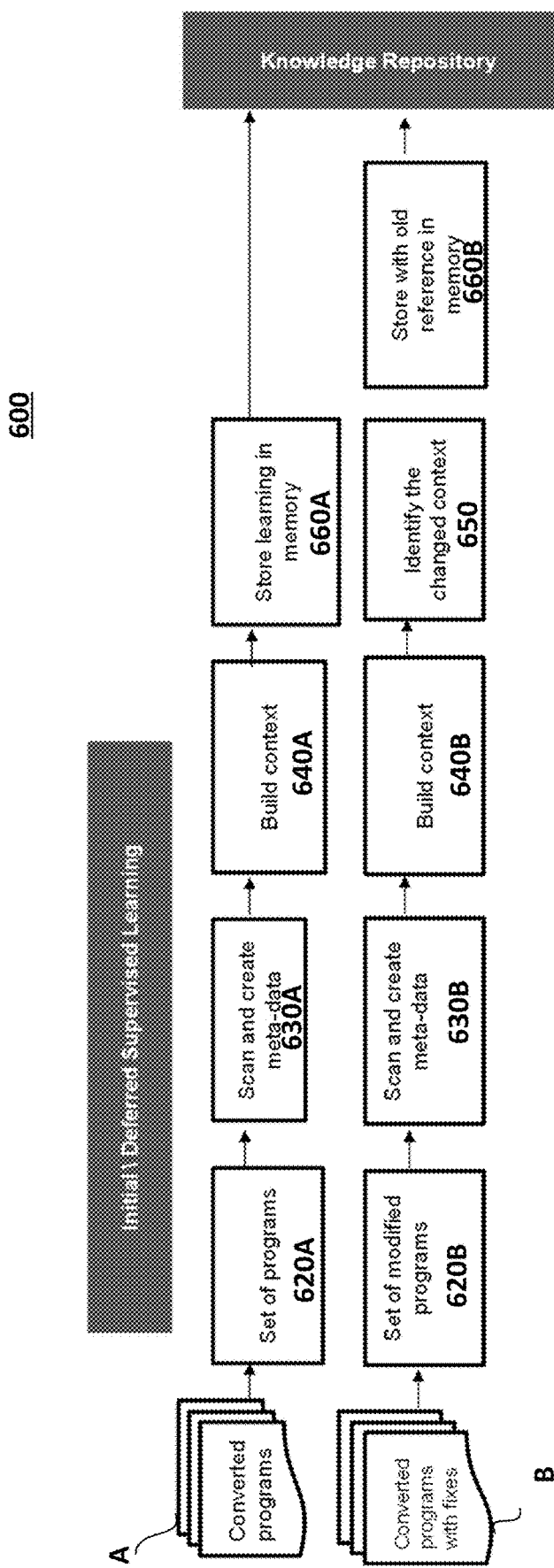

FIG. 6 is a flow diagram of supervised learning by an artificial intelligence module in accordance with an embodiment.

According to embodiments, supervised learning 600 by the artificial intelligence module can include learning based on a response generated for a task request for initial logic programming (pathway A), and/or learning based on a response generated for a task request for deferred logic programming with fixes (pathway B).

Pathway A: After parsing with OpenNLP and NLU (discussed in FIG. 5), an initial context information is created. Then, referring to FIG. 6, in pathway A where a task is requested for initial logic programming (for instance, a TODO tag in a converted program), a neural network receives the converted program(s) at 620A, and scans and creates metadata for the converted program(s) at 630A. The neural network builds a full context for output data for target program(s) at 640A, and transmits the full context for the target program(s) to a knowledge repository for storage at 660A.

Pathway B: After parsing with OpenNLP and NLU (discussed in FIG. 5), an initial context information is created. In pathway B where a task is requested for deferring logic programming (for instance, a TODO tag in a converted program including previous fixes), the neural network receives the converted program(s) at 620B, and scans and creates metadata for the converted program(s) at 630B. The neural network builds a second full context for output data for target program(s) at 640B, and identifies the changed context at 650. At 660B, the neural network transmits the second full context to the knowledge repository for storage with the first full context previously stored in the knowledge repository.

In an embodiment, the knowledge repository stores the original problem dataset and corresponding fixes (referred to as a "training data set"), or provides a solution for the problem if available in the knowledge repository. The changed dataset with the corresponding solution, collectively as a training data set, is available for further unsupervised learnings. Subsequent problems, which require a same solution, can be addressed based on the previously stored training data set in the knowledge repository.

In an embodiment, the first stage in an artificial intelligence module is an initial supervised learning. In the supervised learning, each training data set consists of an input data object and an expected output data. The training data consists of one or more training data sets.

The following is an example of supervised learning according to an embodiment.

EXAMPLE 1

Supervised Learning

First, a COBOL file having multiple TODO tag is given as input data to an artificial intelligence module, along with reference metadata for the expected output. The artificial intelligence module identifies the program structure of the COBOL file. References preceding and subsequent to the TODO fixing lines are identified from metadata. The expected output for each TODO fixing line is stored in a knowledge repository along with the references for the respective TODO.

Using the COBOL file, the neural network is configured and adjusted to get appropriate output. The configured and adjusted neural network is available for subsequent input data having one or more of the same TODO tags.

Having a variety of input data and identifying the metadata references for the input data are important to achieve maximum accuracy in the neural network output. Initially, for the first few sets of input data, this may be manual process and repeated for rest of the training data to train the AI virtual programmer.

If training data is available in the knowledge repository, the training data can be used as reference metadata in the artificial intelligence module. Therefore, if new input data is receive, the artificial intelligence module performs a forward search and a backward search of the input data to extract context data. Using the reference metadata, the system can automatically determine the most suitable solution for the context data. With the extracted context data, the artificial intelligence module feeds the context data and input data to a pre-trained and tuned neural network. The artificial intelligence module adjusts the weightage and links in the neural network at runtime to produce an accurate output for an action plan.

In an embodiment, the neural network is configured based on the skills of the artificial intelligence module. For different skills and different variation, various neural network configurations can be used. For instance, for the TODO FIX-COBOL to Java variation skill, the artificial intelligence module uses a neural network having 4-6 hidden layers, which determines the type and variation of the TODO task and then produces the output data. The output data provides information about type of TODO, variation of the TODO and reference metadata generated by the neural network. The neural network having 4-6 hidden layers can use back-propagation along with a sigmoid function. Back-propagation is a method used in neural networks to calculate a gradient needed in the calculation of the weights to be used in the neural network. A sigmoid function is used in neural networks to introduce nonlinearity in the model. A neural network element computes a linear combination of input signals, and applies a sigmoid function to the result.

Figure 7:
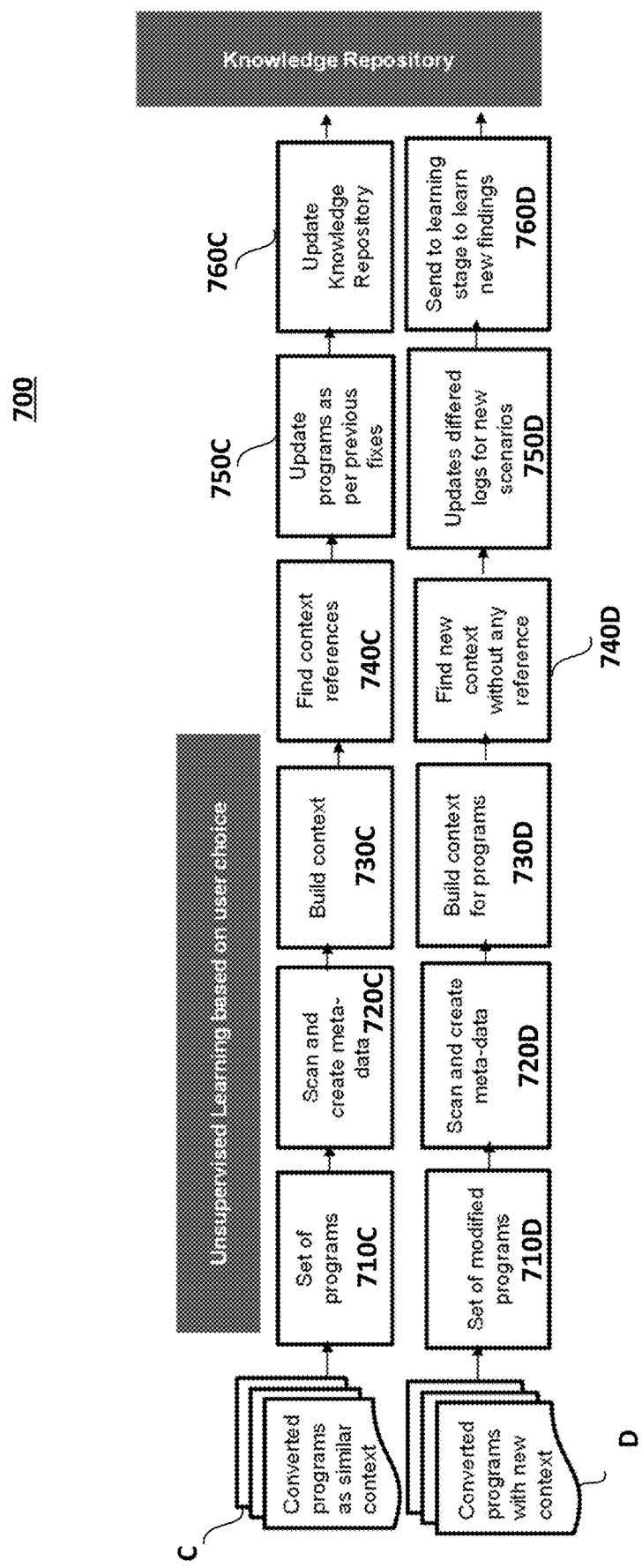

FIG. 7 is a flow diagram of unsupervised learning by an artificial intelligence module in accordance with an embodiment.

According to embodiments, unsupervised learning 700 by the artificial intelligence module can include learning based on an output data response generated for a task request for logic programming with similar context (pathway C), and/or learning based on a task request for logic programming with new context (pathway D).

Pathway C: After parsing the input data using an Open NLP and NLU (as discussed in FIG. 5), references preceding and subsequent to the problematic logic programming are identified. References such as a type of action performed before the problematic logic programming and a type of action are performed after the problematic logic programming are identified. Referring to FIG. 7, in pathway C where a task is requested for logic programming with similar context, a neural network receives the converted program(s) based on the configuration of the neural network, at 710C. The neural network scans and creates metadata for the converted program(s) at 720C. At 730C, the neutral network builds a full context for output data for the target program(s), and, at 740C, the neural network finds context reference(s) from a knowledge repository. The neural network updates the converted program(s) using the previous fixes, at 750C, and transmits the context references and the converted program(s) to the knowledge repository for storage, at 760C.

For instance, in the case where the input data is converted programs with similar context, the neural network creates metadata, and builds a full context for the output data. The neural networks then finds existing context reference(s) from the knowledge repository, and updates the converted programs using the previous fixes. The neural network then updates the knowledge repository with the converted program(s) and the context reference(s).

Pathway D: In pathway D where a task is requested for logic programming with new context, the input data is parsed (as discussed in FIG. 5), and references preceding and subsequent to the problematic logic programming are identified. At 710D and 720D, the converted programs with the new context are received and scanned by a neural network to generate run-time metadata. The neural network builds a full context for output data for target program(s), at 730D. The neural network searches for a new context without any reference(s) at 740D. If a new context without a reference is found, then the neural network updates deferred learning log(s) for new scenarios, at 750D. The neural network transmits the new context and the converted program(s) to the knowledge repository for storage, at 760D.

For instance, in case where the input data is converted programs with new context, the neural network creates metadata, and builds a full context for output data for the target program(s). If new context without any references is found, the neural network updates deferred learning log(s) for the new scenario identified. The neural network transmits the detail information about newly identified scenario to the knowledge repository for storage.

An artificial intelligence module according to an embodiment exhibits swarm intelligence with one or more other artificial intelligence module. Swarm intelligence is a collective behavior of multiple decentralized multiple artificial intelligence modules. The multiple artificial intelligence modules are self-organized and in a group. The artificial intelligence modules are configured to work as a group and refer to a collective knowledge repository. Thus, a single artificial intelligence module is configured to access the collective knowledge repository in addition to its own centralized knowledge repository. With swarm intelligence, a solution is available to all of the artificial intelligence module in the group to amplify the learning accuracy. For swarm intelligence, an algorithm allows a neural network to use the collective knowledge repository in addition to the centralized knowledge repository. Swarm intelligence is supported by the processing of the data using the neural network of each artificial intelligence modules in the group. Using an artificial intelligence module with swarm intelligence amplifies the intelligence of each artificial intelligence module in the swarm by allowing the artificial intelligence modules to think together as unified systems. Swarm intelligence is useful for multiple objective problems and dynamic problems that keep changing.

In an embodiment, the information can be proposed to the entire swarm for decision making, and the shared information is used in combination to generate the final outcome. When multiple artificial intelligence modules work in a group, even the smallest changes are shared to allow for fine tuning, thus making micro changes to the rest of the swarm.

FIG. 8 is a diagram illustrating artificial intelligence modules working in isolation in accordance with an embodiment. In the FIG. 8, there is no flow of information between artificial intelligence modules 810, 820 and 830.

Figure 9A:
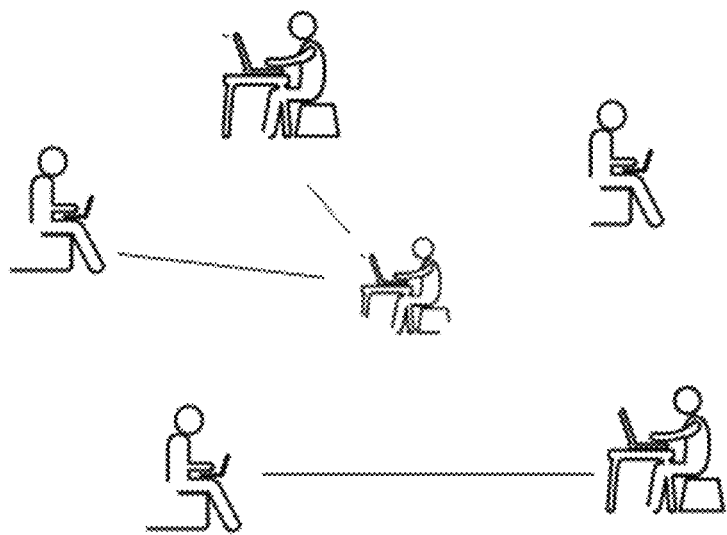
FIGS. 9A and 9B are diagrams illustrating artificial intelligence modules sharing information in accordance with embodiments.
Figure 9B:
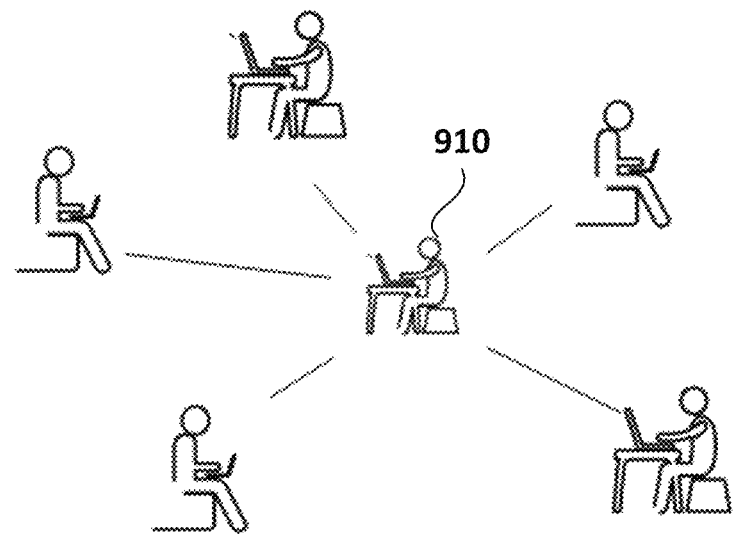

FIGS. 9A and 9B are diagrams illustrating artificial intelligence modules sharing information in accordance with embodiments.

In FIG. 9A, some knowledge is shared between some artificial intelligence modules but all of the artificial intelligence module do not benefit from the shared knowledge.

In FIG. 9B, information from a single artificial intelligence module 910 is shared with each of the artificial intelligence modules. However, information is mostly centralized for all of the artificial intelligence modules except artificial intelligence module 910. Further, the information is processed based on either an individual decision or overall group decision.

Figure 10:
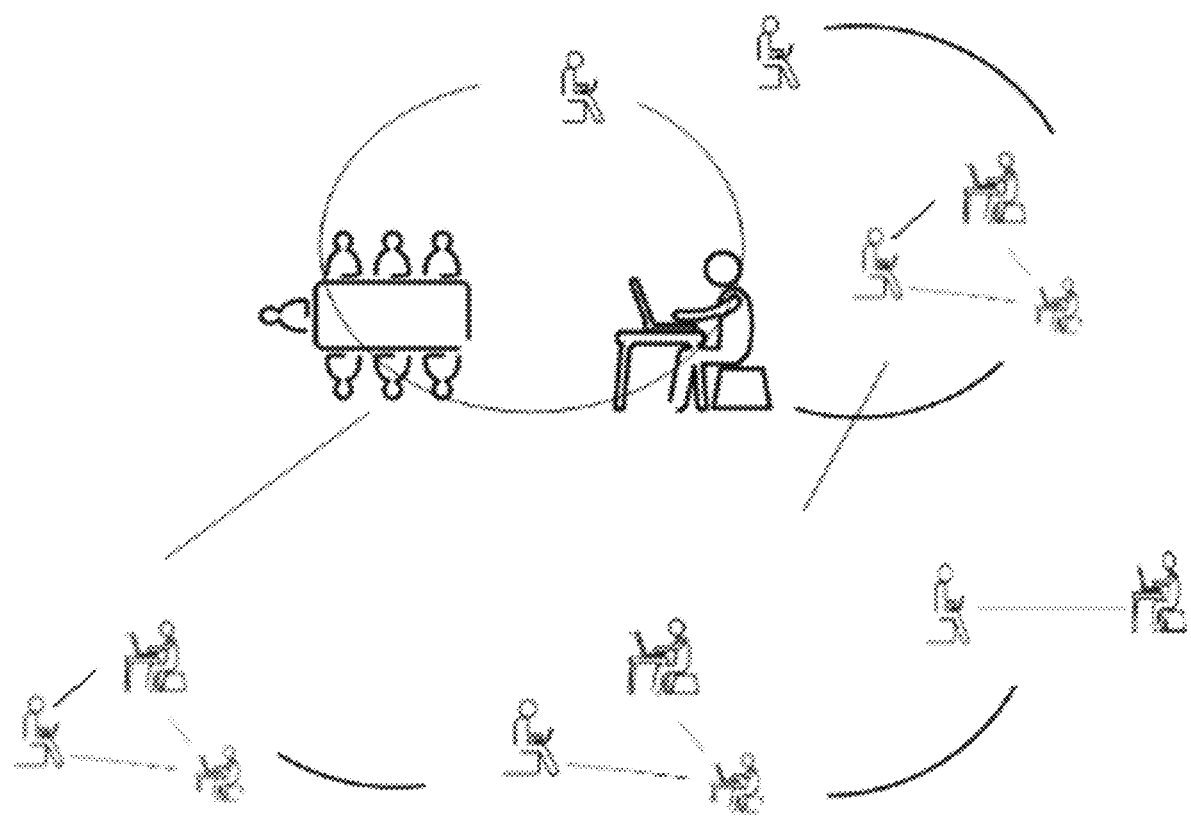

FIG. 10 is a diagram illustrating artificial intelligence modules functioning as a swarm in accordance with an embodiment.

Referring to FIG. 10, information is shared by all of the artificial intelligence modules with no lead artificial intelligence module.

In an embodiment, swarm intelligence can occur via self-organized interactions between smaller groups of artificial intelligence modules. If a decision is made, all of the artificial intelligence modules in the smaller group arrive at the same decision if presented with the same input data.

In an embodiment, several groups of artificial intelligence modules work independently of each other on different target program(s), and the groups each share the information or decision-making with artificial intelligence modules within their group, but not with artificial intelligence modules in other groups of the swarm. The artificial intelligence modules can work in a small group to achieve maximum efficiency. If some of the artificial intelligence modules in the group cannot individually achieve a requested task, the group of artificial intelligence modules may collectively be able to complete the requested task. In an embodiment, an artificial intelligence module's decision making can be restricted to a small group of the swarm to achieve maximum scalability, robustness, speed and modularity.

It is to be noted that, a small change can result in different group level behavior of the swarm. Each artificial intelligence module has a set of rules to follow, leading to self-organization. Based on information input by other artificial intelligence module, the artificial intelligence modules are able to use their own dynamically created rules to complete their task, amplifying the changes in the network propagation.

Figure 11:
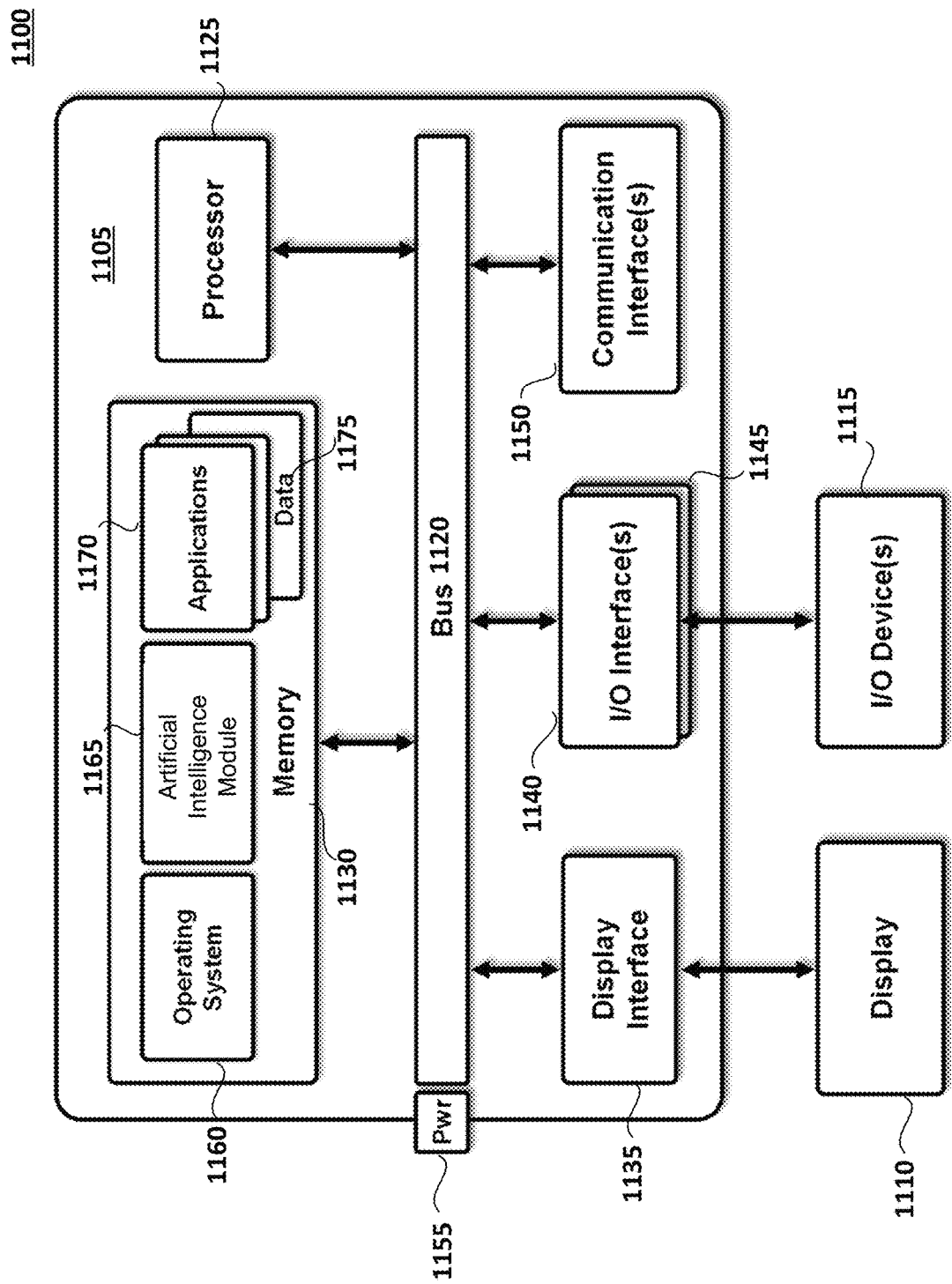

FIG. 11 illustrates a block diagram of an electronic device in accordance with an embodiment.

Referring to FIG. 11, electronic device 1100 includes computer 1105, display 1110, and, in some embodiments, one or more I/O devices 1115.

Electronic device 1100 can be a stationary electronic device (such as, for example, a desktop computer) or a portable electronic device (such as, for example, a laptop, tablet, etc.). Computer 1105 includes bus 1120, processor 1125, memory 1130, display interface 1135, one or more I/O interfaces 1140, 1145 and one or more communication interfaces 1150. Generally, display interface 1135 is coupled to display 1110, I/O interface 1140 is coupled to I/O device 1115 using a wired or wireless connection, and communication interface 1150 can be connected to antenna (not shown) and coupled to network (not shown) using a wireless connection. If electronic device 1100 is a stationary electronic device, communication interface 1150 can be connected to the network using a wired or a wireless connection. One of the I/O interfaces 1140, 1145 can be connected to the antenna.

Bus 1120 is a communication system that transfers data between processor 1125, memory 1130, display interface 1135, I/O interfaces 1140,1145, and communication interface 1150, as well as other components not depicted in FIG. 11. Power connector 1155 is coupled to bus 1120 and a power supply (not shown), such as a battery, etc.

Processor 1125 includes one or more general-purpose or application-specific microprocessors to perform computation and control functions for computer 1105. Processor 1125 can include a single integrated circuit, such as a micro-processing device, or multiple integrated circuit devices and/or circuit boards working in cooperation to accomplish the functions of processor 1125. In addition, processor 1125 can execute computer programs, such as operating system 1160, artificial intelligence module 1165, other applications 1170, or data 1175 stored within memory 1130.

Memory 1130 stores information and instructions for execution by processor 1125. Memory 1130 can contain various components for retrieving, presenting, modifying, and storing data. For example, memory 1130 can store software modules that provide functionality if executed by processor 1125. The modules can include an operating system 1160 that provides operating system functionality for computer 1105. The modules can also include artificial intelligence module 1165 that provides the learning and processing functions described above. Applications 1170 can include other applications that cooperate with artificial intelligence module 1165. Data 1175 can include training data of the multiple programming languages, information associated with the natural human language communication, languages semantics, programming languages references, domain specific contexts, programming language contextual trained data, metadata and other references (such as references required for the communication and to make decisions).

Generally, memory 1130 can include a variety of non-transitory computer-readable medium that can be accessed by processor 1125. In the various embodiments, memory 1130 can include a volatile medium, a nonvolatile medium, both volatile and nonvolatile mediums, a removable and non-removable medium, a communication medium, and a storage medium. A communication medium can include computer readable instructions, data structures, program modules, or other data in a modulated data signal such as a carrier wave or other transport mechanism, and can include any other form of an information delivery medium known in the art. A storage medium can include a volatile memory (e.g., random access memory ("RAM"), dynamic RAM ("DRAM"), static RAM ("SRAM"), synchronous dynamic random access memory ("SDRAM")), or a non-volatile memory (e.g., read only memory ("ROM"), flash memory, cache memory, programmable read-only memory ("PROM"), erasable programmable read-only memory ("EPROM"), electrically erasable programmable read-only memory ("EEPROM")), registers, hard disk, a removable disk, a compact disk read-only memory ("CD-ROM"), or any other form of a storage medium known in the art.

Display interface 1135 is coupled to display 1110.

I/O interfaces 1140,1145 are configured to transmit and/or receive data from I/O devices 1115. I/O interfaces 1140,1145 enable connectivity between processor 1125 and I/O devices 1115 by encoding data to be sent from processor 1125 to I/O devices 1115, and decoding data received from I/O devices 1115 for processor 1125. Generally, data can be sent over wired and/or a wireless connections. For example, I/O interfaces 1140,1145 can include one or more wired communications interfaces, such as USB or Ethernet, and/or one or more wireless communications interfaces, coupled to one or more antennas, such as WiFi, cellular, BLUETOOTH, cloud-based interface, or similar platforms.

Display 1110 can be a liquid crystal display (LCD) of a laptop, a tablet, or a similar device.

Generally, I/O device 1115 is a device configured to provide input to computer 1105, and/or output from computer 1105. I/O device 1115 is operably connected to computer 1105 using either a wireless connection or a wired connection. I/O device 1115 can include a local processor coupled to a communication interface that is configured to communicate with computer 1105 using the wired or wireless connection.

For example, I/O device 1115 can be an input device such as a touchscreen for display 1110, a touchpad, a keypad or keyboard, etc.

I/O device 1115 can be an output device, such as one or more audio speakers. Processor 1125 can transmit an audio signal to a speaker (I/O device 1115) through an audio interface (I/O interface 1140), which in turn outputs audio effects.

According to embodiments of the present invention, extracted input data information including of the natural human language and technical details are arranged in the most logical manner. Using a knowledge repository and this information, a Decision Model gets the appropriate language reference and domain specific trained data. The trained data consists of generic-to-domain specific programs from the knowledge repository. Using the input data, technical details, domain specific programs, programming language context, collectively, the artificial intelligence module prepares the input data for a neural network. The neural network determines probable solutions, and an Action Plan API (a simple interface which performs predefined tasks based on input) identifies an action plan for resolving the problems in the input data. Upon execution of the action plan, the input data is transcoded into a new program, which is sent to an individual for review and/or to an external source for execution.

The systems and methods of generating a computer program using the artificial intelligence module according to embodiments reduces or eliminates the time and/or effort generally spent by an individual to resolve and perform repetitive programming tasks. The artificial intelligence module improves productivity by resolving and performing programming tasks more quickly than the individual.

Several embodiments have been specifically illustrated and/or described. However, it will be appreciated that modifications and variations of the disclosed embodiments are covered by the above teachings and within the purview of the appended claims without departing from the spirit and intended scope of the invention.

What is claimed is:

1. A method of generating a computer program using artificial intelligence, the method comprising:
    generating, at an artificial intelligence module, logic programming by analyzing natural language in sample input data received from an external source, the sample input data resulting in a known output;
    receiving select input data, the select input data including select natural language or a coding instruction including the select natural language;
    generating context data by processing, using an artificial neural network of the artificial intelligence module, the select natural language;
    selecting the logic programming based on the context data;
    determining, at the artificial intelligence module, a computing instruction for the select input data using the logic programming; and
    generating the computer program, the computer program including the computing instruction.

2. The method of claim 1, further comprising:
    storing the logic programming in a knowledge repository;
    receiving process input data,
        the process input data being a result of the computing instruction, and
        the process input data including the select natural language or the coding instruction including the select natural language;
    generating process context data by processing, at the artificial intelligence module, the select natural language in the process input data;
    generating additional logic programming based on a comparison between the process context data and the context data; and
    storing the additional logic programming in the knowledge repository.

3. The method of claim 1, further comprising:
    storing the logic programming in a knowledge repository; and
    receiving subsequent input data,
        the subsequent input data including the select natural language or the coding instruction including the select natural language, and
        the subsequent input data being different from the select input data;
    generating subsequent context data by processing, at the artificial intelligence module, the select natural language in the subsequent input data;

retrieving the logic programming from the knowledge repository based on a comparison between the subsequent context data and the context data; and determining, at the artificial intelligence module, a subsequent computing instruction for the subsequent input data using the logic programming; and updating the computer program to include the subsequent computing instruction.

4. The method of claim 1, wherein the select input data is encoded in a first logic programming language, and the logic programming is encoded in a second logic programming language, the second logic programming language being different than the first logic programming language.

5. The method of claim 1, wherein the generating of the context data includes creating metadata for the select input data by performing, using a natural language processing module, at least one of sentiment analysis, sentence recognition, relationship extraction or language detection; and generating the context data using the metadata.

6. The method of claim 1, further comprising:

storing the logic programming in a knowledge repository;

receiving initial input data, the initial input data including natural language or a coding instruction including the natural language;

generating context data by processing, at the artificial intelligence module, the natural language;

identifying select data in the context data, the select data including the natural language or the coding instruction including the natural language;

generating select context data by processing, at the artificial intelligence module, the natural language in the select data;

generating, at the artificial intelligence module, select logic programming for the select context data, the generating of the select logic programming being based on the logic programming;

determining, at the artificial intelligence module, a select computing instruction for the select data using the select logic programming; and generating a select computer program, the select computer program including the select computing instruction.

7. The method of claim 6, further comprising:

storing the select logic programming in the knowledge repository; and receiving subsequent input data, the subsequent input data including the natural language or the coding instruction including the natural language, and the subsequent input data being different from the select data;

generating subsequent context data by processing, at the artificial intelligence module, the natural language in the subsequent input data;

retrieving the select logic programming from the knowledge repository based on a comparison between the subsequent context data and the select context data; and determining, at the artificial intelligence module, a subsequent computing instruction for the subsequent input data using the select logic programming; and updating the select computer program to include the subsequent computing instruction.

8. The method of claim 6, wherein the initial input data and the select data are encoded in a first logic programming language, and the logic programming is encoded in a second logic programming language, the second logic programming language being different than the first logic programming language.

9. A system for generating a computer program using artificial intelligence, the system comprising:

a processor; and a memory storing a program for execution by the processor, the program including instructions for generating, at an artificial intelligence module, logic programming by analyzing natural language in sample input data received from an external source, the sample input data resulting in a known output;

receiving select input data, the select input data including select natural language or a coding instruction including the select natural language;

generating context data by processing, at the artificial intelligence module, the select natural language;

selecting the logic programming based on the context data;

determining, at the artificial intelligence module, a computing instruction for the select input data using the logic programming; and generating the computer program, the computer program including the computing instruction.

10. The system of claim 9, wherein the program includes instructions for:

storing the logic programming in a knowledge repository;

receiving process input data, the process input data being a result of the computing instruction, and the process input data including the select natural language or the coding instruction including the select natural language;

generating process context data by processing, at the artificial intelligence module, the select natural language in the process input data;

generating additional logic programming based on a comparison between the process context data and the context data; and storing the additional logic programming in the knowledge repository.

11. The system of claim 9, wherein the program includes instructions for:

storing the logic programming in a knowledge repository; and receiving subsequent input data, the subsequent input data including the select natural language or the coding instruction including the select natural language, and the subsequent input data being different from the select input data;

generating subsequent context data by processing, at the artificial intelligence module, the select natural language in the subsequent input data;

retrieving the logic programming from the knowledge repository based on a comparison between the subsequent context data and the context data; and determining, at the artificial intelligence module, a subsequent computing instruction for the subsequent input data using the logic programming; and updating the computer program to include the subsequent computing instruction.

12. The system of claim 9, wherein the select input data is encoded in a first logic programming language, and the logic programming is encoded in a second logic programming language, the second logic programming language being different than the first logic programming language.

13. The system of claim 9, wherein the generating of the context data includes
   creating metadata for the select input data by performing, using a natural language processing module, at least one of sentiment analysis, sentence recognition, relationship extraction or language detection; and
   generating the context data using the metadata.

14. The system of claim 9, wherein the program includes instructions for:
   storing the logic programming in a knowledge repository;
   receiving initial input data, the initial input data including natural language or a coding instruction including the natural language;
   generating context data by processing, at an the artificial intelligence module, the natural language;
   identifying select data in the context data, the select data including the natural language or the instruction including the natural language;
   generating select context data by processing, at the artificial intelligence module, the natural language in the select data;
   generating, at the artificial intelligence module, select logic programming for the select context data, the generating of the select logic programming being based on the logic programming;
   determining, at the artificial intelligence module, a select computing instruction for the select data using the select logic programming; and
   generating a select computer program, the select computer program including the select computing instruction.

15. The system of claim 14, wherein the instructions further comprise:
   storing the select logic programming in the knowledge repository; and
   receiving subsequent input data,
      the subsequent input data including the natural language or the coding instruction including the natural language, and
      the subsequent input data being different from the select data;
   generating subsequent context data by processing, at the artificial intelligence module, the natural language in the subsequent input data;
   retrieving the select logic programming from the knowledge repository based on a comparison between the subsequent context data and the select context data; and
   determining, at the artificial intelligence module, a subsequent computing instruction for the subsequent input data using the select logic programming; and
   updating the select computer program to include the subsequent computing instruction.

16. The system of claim 14, wherein the initial input data and the select data are encoded in a first logic programming language, and the logic programming is encoded in a second logic programming language, the second logic programming language being different than the first logic programming language.

17. A non-transitory computer readable medium having instructions embodied thereon that, when executed by a processor, cause the processor to perform operations comprising:
   generating, at an artificial intelligence module, logic programming by analyzing natural language in sample input data received from an external source, the sample input data resulting in a known output;
   receiving select input data, the select input data including select natural language or a coding instruction including the select natural language;
   generating context data by processing, at the artificial intelligence module, the select natural language;
   selecting the logic programming based on the context data;
   determining, at the artificial intelligence module, a computing instruction for the select input data using the logic programming; and
   generating a computer program, the computer program including the computing instruction.

18. The non-transitory computer readable medium of claim 17, wherein the operations further comprise:
   storing the logic programming in a knowledge repository;
   receiving process input data,
      the process input data being a result of the computing instruction, and
      the process input data including the select natural language or the coding instruction including the select natural language;
   generating process context data by processing, at the artificial intelligence module, the select natural language in the process input data;
   generating additional logic programming based on a comparison between the process context data and the context data; and
   storing the additional logic programming in the knowledge repository.

19. The non-transitory computer readable medium of claim 17, wherein the operations further comprise:
   storing the logic programming in a knowledge repository; and
   receiving subsequent input data,
      the subsequent input data including the select natural language or the coding instruction including the select natural language, and
      the subsequent input data being different from the select input data;
   generating subsequent context data by processing, at the artificial intelligence module, the select natural language in the subsequent input data;
   retrieving the logic programming from the knowledge repository based on a comparison between the subsequent context data and the context data; and
   determining, at the artificial intelligence module, a subsequent computing instruction for the subsequent input data using the logic programming; and
   updating the computer program to include the subsequent computing instruction.

20. The non-transitory computer readable medium of claim 17, wherein the select input data is encoded in a first logic programming language, and the logic programming is encoded in a second logic programming language, the second logic programming language being different than the first logic programming language.

21. The non-transitory computer readable medium of claim 17, wherein the generating of the context data includes
   creating metadata for the select input data by performing, using a natural language processing module, at least one of sentiment analysis, sentence recognition, relationship extraction or language detection; and
   generating the context data using the metadata.

22. The non-transitory computer readable medium of claim 17, wherein the operations further comprise:

storing the logic programming in a knowledge repository;
receiving initial input data, the initial input data including natural language or a coding instruction including the natural language;
generating context data by processing, at the artificial intelligence module, the natural language;
identifying select data in the context data, the select data including the natural language or the coding instruction including the natural language;
generating select context data by processing, at the artificial intelligence module, the natural language in the select data;
generating, at the artificial intelligence module, select logic programming for the select context data, the generating of the select logic programming being based on the logic programming;
determining, at the artificial intelligence module, a select computing instruction for the select data using the select logic programming; and
generating a select computer program, the select computer program including the select computing instruction.

23. The non-transitory computer readable medium of claim 22, wherein the operations further comprise:
storing the logic programming in the knowledge repository; and
receiving subsequent input data,
the subsequent input data including the natural language or the coding instruction including the natural language, and
the subsequent input data being different from the select data;
generating subsequent context data by processing, at the artificial intelligence module, the natural language in the subsequent input data;
retrieving the select logic programming from the knowledge repository based on a comparison between the subsequent context data and the select context data; and
determining, at the artificial intelligence module, a subsequent computing instruction for the subsequent input data using the select logic programming; and
updating the select computer program to include the subsequent computing instruction.

24. The non-transitory computer readable medium of claim 22, wherein the initial input data and the select data are encoded in a first logic programming language, and the logic programming is encoded in a second logic programming language, the second logic programming language being different than the first logic programming language.

* * * * *